United States Patent
Cheng et al.

(10) Patent No.: US 9,110,906 B2
(45) Date of Patent: Aug. 18, 2015

(54) FILE CONVERTING METHOD FOR COMPUTER SYSTEM

(71) Applicant: Wistron Corporation, New Taipei (TW)

(72) Inventors: Fan Cheng, New Taipei (TW); Jiefeng Yin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 281 days.

(21) Appl. No.: 13/872,162

(22) Filed: Apr. 29, 2013

(65) Prior Publication Data

US 2014/0245301 A1    Aug. 28, 2014

(30) Foreign Application Priority Data

Feb. 25, 2013    (CN) .......................... 2013 1 0058715

(51) Int. Cl.
| | |
|---|---|
| *G06F 9/455* | (2006.01) |
| *G06F 9/46* | (2006.01) |
| *G06F 15/173* | (2006.01) |
| *G06F 17/30* | (2006.01) |

(52) U.S. Cl.
CPC .......... *G06F 17/30076* (2013.01); *G06F 9/455* (2013.01); *G06F 9/4552* (2013.01); *G06F 9/45516* (2013.01); *G06F 9/45533* (2013.01); *G06F 9/45537* (2013.01); *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,539,484 B1* | 9/2013 | Offer et al. ........................ | 718/1 |
| 2008/0263258 A1* | 10/2008 | Allwell et al. ..................... | 711/6 |
| 2009/0300641 A1* | 12/2009 | Friedman et al. ............. | 718/104 |
| 2011/0035754 A1* | 2/2011 | Srinivasan .................... | 718/105 |
| 2011/0055396 A1* | 3/2011 | Dehaan ........................ | 709/226 |
| 2012/0254364 A1 | 10/2012 | Vijayan | |
| 2013/0132691 A1* | 5/2013 | Banga et al. .................. | 711/162 |
| 2013/0139157 A1* | 5/2013 | Koh et al. .......................... | 718/1 |
| 2013/0152084 A1* | 6/2013 | Arcese et al. ..................... | 718/1 |
| 2013/0166504 A1* | 6/2013 | Varkhedi et al. .............. | 707/610 |

* cited by examiner

*Primary Examiner* — Charles Swift

(74) *Attorney, Agent, or Firm* — Winston Hsu; Scott Margo

(57) ABSTRACT

A file converting method for a computer system includes utilizing software for converting a full-virtualized file into a para-virtualized file when the computer system receives a click signal; and activating a virtual machine, and uploading the para-virtualized file to a cloud server.

16 Claims, 4 Drawing Sheets

FILE CONVERTING METHOD FOR COMPUTER SYSTEM

BACKGROUND OF THE INVENTION

1. Field of the Invention

The present invention relates to a file converting method, and more particularly, to a file converting method capable of converting a full-virtualized file into a para-virtualized file in a computer system.

2. Description of the Prior Art

With cloud computing technology advances, virtualization becomes an essential technique for effectively integrating resources and reducing costs for an enterprise database. The virtualization can be divided into full-virtualization and para-virtualization based on the technology. For the full-virtualization technology, hardware in a practical server is simulated, and the system can be operated in a full-virtualized hardware with the virtualization server, where each of the virtualization servers has an independent operating system and application to be operated independently. For the para-virtualization technology, a hypervisor is utilized allowing the virtualization server to retrieve hardware operating resources, and the operating system of the user is modified to be able to communicate with the hypervisor. In the para-virtualization system, the virtualization server can directly retrieve the hardware operating resources without an extra operating system. Therefore, in comparison with the full-virtualization technology, the para-virtualization technology has a preferable efficiency.

Recently, the industry has developed different types of virtualization software which supports different types of virtualization technologies. Among these virtualization software, kernel-based virtual machine (KVM) and VMware support the full-virtualization technology, and Xen supports the para-virtualization technology. Each virtualization file is only applicable to a specific virtualization technology, e.g. a .vmdk file is applicable to VMware full-virtualization, and a .xen file is applicable to Xen para-virtualization. In the prior art, these virtualization files cannot be converted between various types arbitrarily. A full-virtualized file for the full-virtualization technology can only be processed by the full-virtualization software, which usually possesses a poor performance. Therefore, there is a need for improvement over the prior art.

SUMMARY OF THE INVENTION

It is therefore an objective of the present invention to provide a file converting method capable of converting a full-virtualized file into a para-virtualized file in a computer system, such that the full-virtualized file which can only support the full-virtualization technology originally will benefit from the higher performance of the para-virtualization technology after the conversion.

An embodiment of the invention discloses a file converting method for a computer system. The file converting method comprises utilizing software for converting a full-virtualized file into a para-virtualized file when the computer system receives a click signal; and activating a virtual machine, and uploading the para-virtualized file to a cloud server.

An embodiment of the invention further discloses a non-transitory computer-readable storage medium, having embodied thereon a program being executable by a processor to perform a file converting method for a computer system. The file converting method comprises utilizing software for converting a full-virtualized file into a para-virtualized file when the computer system receives a click signal; and activating a virtual machine, and uploading the para-virtualized file to a cloud server.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
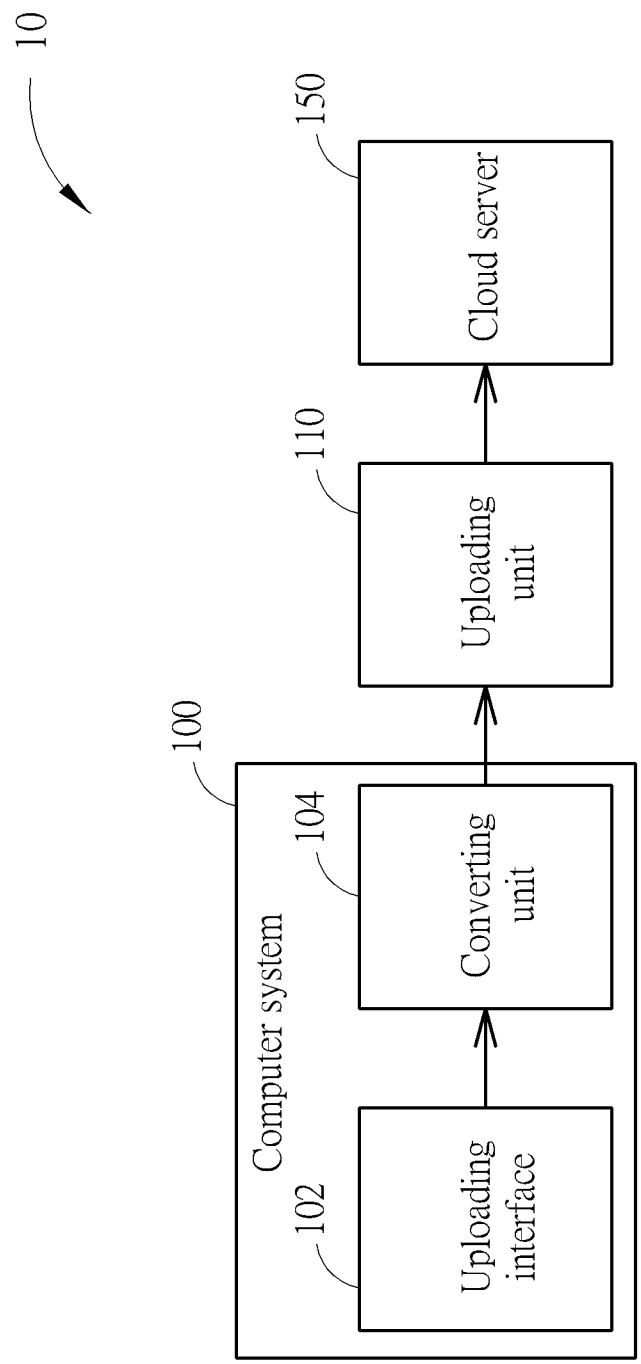
FIG. 1 is a schematic diagram of a network system according to an embodiment of the invention.

Please refer to FIG. 1, which is a schematic diagram of a network system 10 according to an embodiment of the invention. As shown in FIG. 1, the network system 10 can substantially be divided into a computer system 100 for an end user and a cloud server 150 for a network. The computer system 100 includes an uploading interface 102 and a converting unit 104. The uploading interface 102 provides an operating interface, which allows the user to input data of the files to be converted and adjust settings related to the file conversion. The converting unit 104 is utilized for converting a full-virtualized file into a para-virtualized file. The network system 10 further includes an uploading unit 110 for uploading a completely converted para-virtualized file to the cloud server 150.

Figure 2:
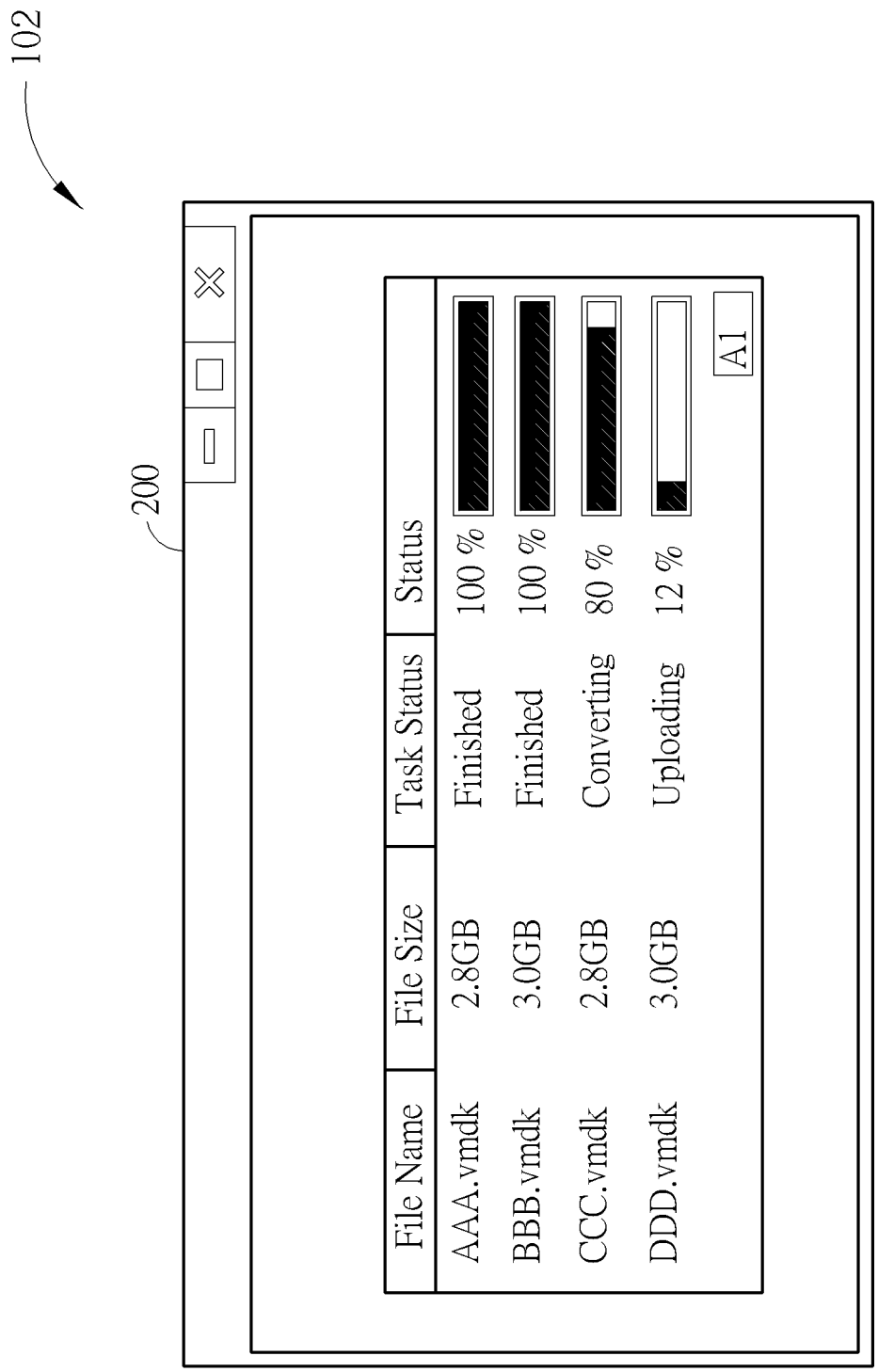
FIG. 2 is a schematic diagram of an embodiment of the uploading interface.

The network system 10 provides a file converting method for converting the full-virtualized file into the para-virtualized file. Please refer to FIG. 2, which is a schematic diagram of an embodiment of the uploading interface 102. As shown in FIG. 2, a VMware full-virtualization file (.vmdk) is converted into Xen para-virtualized file (.xen). The user only needs to click an uploading button A1 on the uploading interface 102, and the file conversion can be performed. The computer system 100 then uploads the completely converted para-virtualized file to the cloud server 150. The uploading interface 102 can be realized by a window 200. The window 200 displays a task status of each full-virtualized file (.vmdk) to be converted and uploaded. The working status may include files which are completely converted and uploaded, files which are converted but still uploading, and files which are converting. For example, in FIG. 2, the task status of files AAA.vmdk and BBB.vmdk shows "Finished", which means that the files AAA.vmdk and BBB.vmdk have been converted into para-virtualized files (.xen) and uploaded to the cloud server 150. The task status of file CCC.vmdk shows "Converting", which means that the file CCC.vmdk is currently being converted from a full-virtualized file into a para-virtualized file. The task status DDD.vmdk shows "Uploading", which means that the file DDD.vmdk has been converted into a para-virtualized file (.xen) but is still uploading. The window 200 may further display other information related to these files, such as estimated task finish time, log files, etc.

Figure 3:
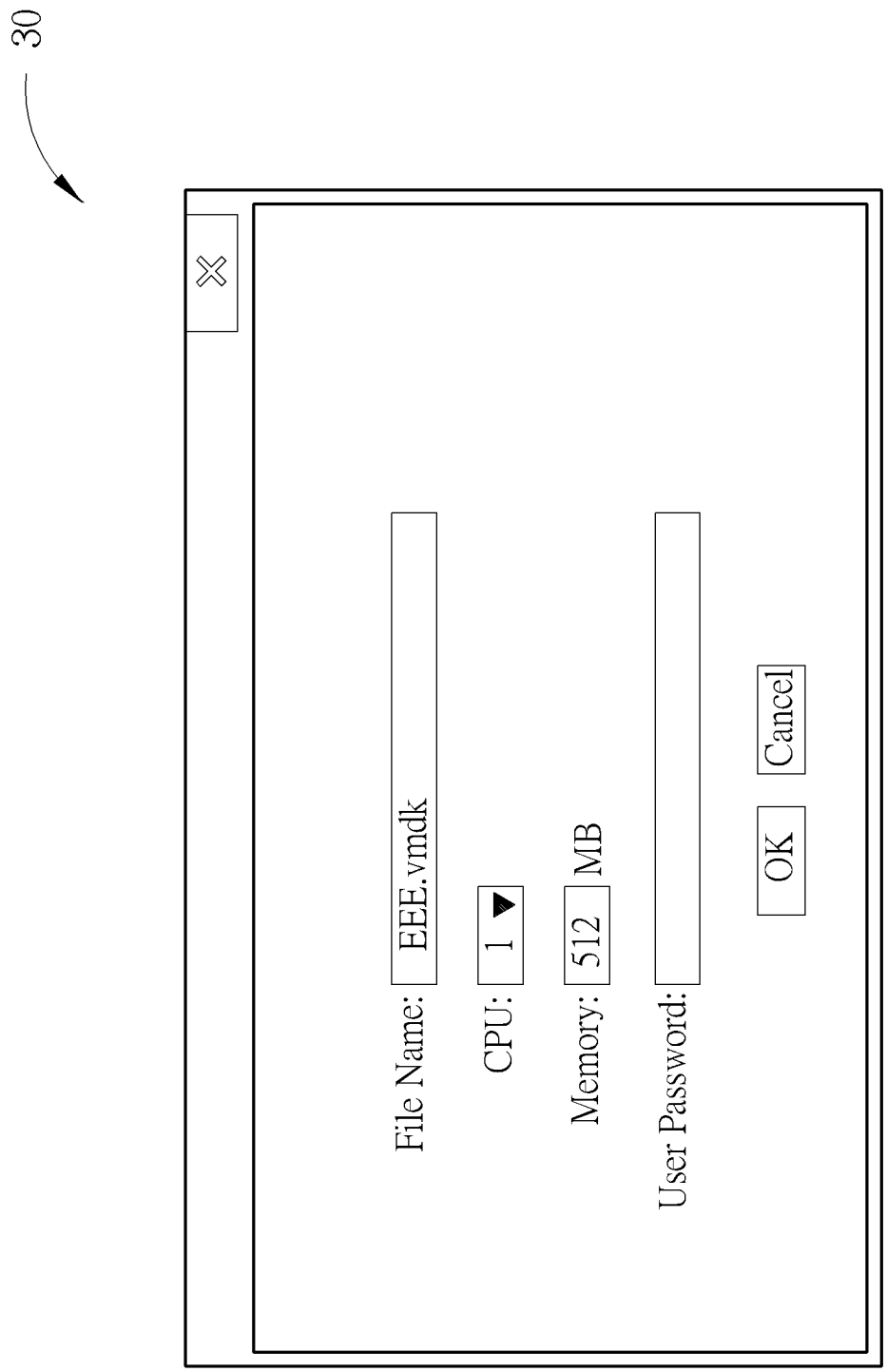
FIG. 3 is a schematic diagram of a task setting page.

As mentioned above, the user only needs to click the uploading button A1 on the uploading interface 102, the file conversion can then be performed. After receiving a click signal corresponding to the uploading button A1, the computer system 100 activates a virtual machine to perform the follow-up tasks of converting and uploading. At this moment, the computer system 100 first shows another page or utilizes other methods to allow the user to select the file to be converted and uploaded. This technique should be well-known by those skilled in the art, and will not be narrated herein. After the user determines the target files to be converted and uploaded, a task setting page 30 appears in the computer system 100. Please refer to FIG. 3, which is a schematic diagram of the task setting page 30. As shown in FIG. 3, the task setting page 30 displays a file EEE.vmdk required to be converted and partial settings related to the uploading, which include settings of the virtual machine such as a memory size of the virtual machine, a number of central processing units (CPUs) utilized by the virtual machine, etc. In FIG. 3, a user password is further required for enhancement of information security. After the user clicks the button "OK", the file EEE.vmdk starts to be converted and uploaded. The computer system 100 first converts the full-virtualized file EEE.vmdk into a para-virtualized file (e.g. EEE.xen) by using software, and then activates the virtual machine with Xen para-virtualization software, in order to upload this para-virtualized file to the cloud server 150. Task information related to the file EEE.vmdk may be displayed in the window 200 or in a new page.

In some embodiments, the computer system 100 further includes a setting interface, which shows various fields corresponding to various converting parameters related to the file conversion and parameters related to the uploading. The user can set these parameters in the setting interface. In addition to the above parameters for the virtual machine (e.g. the memory size of the virtual machine, the number of CPUs utilized by the virtual machine), parameters related to the cloud server 150 may also be set in the setting interface, e.g. the Internet Protocol (IP) address of the cloud server 150, the storage space of the cloud server 150, etc. Any other parameters related to the conversion from the full-virtualized file into the para-virtualized file and the uploading may also be set in the setting interface; these are not limited herein.

In some embodiments, the full-virtualized file to be converted may be segmented into a plurality of sub-files. In such a situation, the plurality of sub-files can be merged into a single file before being converted. Therefore, before a file is completely uploaded, it may be in a task status of "Bundling" before the "Converting" and "Uploading" statuses. These task statuses can all be displayed in the window 200.

Figure 4:
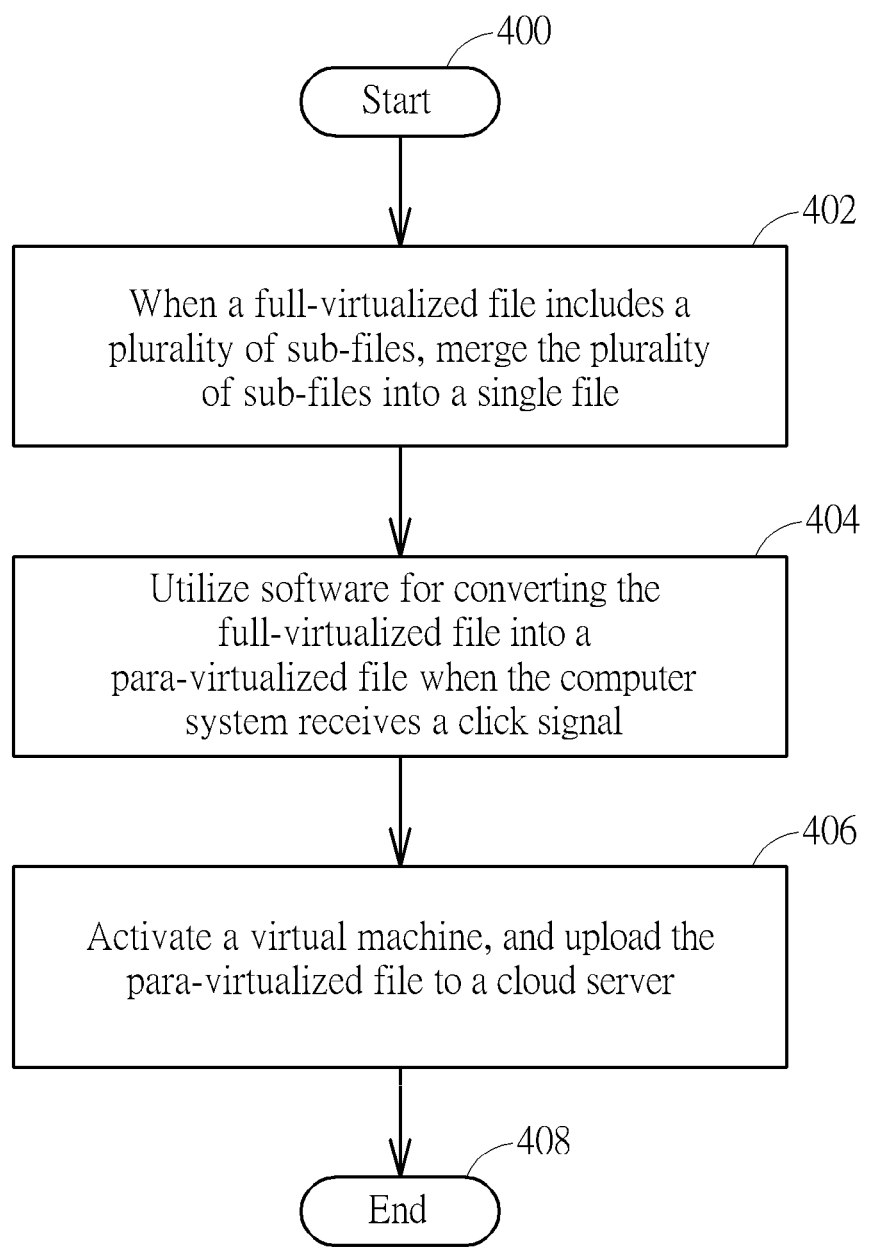
FIG. 4 is a schematic diagram of a file converting process according to an embodiment of the invention.

The above file converting method related to the conversion from the full-virtualized file into the para-virtualized file can be summarized into a file converting process 40, as shown in FIG. 4. The file converting process 40 includes the following steps:

Step 400: Start.
Step 402: When a full-virtualized file includes a plurality of sub-files, merge the plurality of sub-files into a single file.
Step 404: Utilize software for converting the full-virtualized file into a para-virtualized file when the computer system receives a click signal.
Step 406: Activate a virtual machine, and upload the para-virtualized file to a cloud server.
Step 408: End.

Please note that, the present invention provides a method to convert the full-virtualized file into the para-virtualized file, such that the full-virtualized file which can only support the full-virtualization technology originally will benefit from the higher performance of the para-virtualization technology after the conversion. Those skilled in the art can make modifications and alterations accordingly. For example, the above file converting method which converts the full-virtualized file into the para-virtualized file can be applied in various operating systems. For the Windows system, the above converting method may be realized by installing a para-virtualization driver in the computer system 100. For the Linux system, the file configuration and the core of the operating system should be replaced with other forms to be able to support the operation of the para-virtualization, which realizes the above method of converting the full-virtualized file into the para-virtualized file.

The embodiments of the invention can be realized in non-transitory computer-readable storage media. The computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. For example, common forms of computer-readable media may include, a floppy disk, a flexible disk, a hard disk, magnetic tape, any other magnetic medium, a compact disk read-only memory (CD-ROM), digital video disk (DVD), any other optical medium, random access memory (RAM), programmable ROM (PROM), erasable PROM (EPROM), a flash EPROM (FLASHEPROM), any other memory chip or cartridge.

In the prior art, the virtualization files cannot be converted between various types arbitrarily. A full-virtualized file for the full-virtualization technology can only be processed by the full-virtualization software, which usually possesses a poor performance. In comparison, the embodiments of the present invention provide a file converting method for converting a full-virtualized file into a para-virtualized file, such that the full-virtualized file which can only support the full-virtualization technology originally will benefit from the higher performance of the para-virtualization technology after the conversion.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A file converting method for a computer system, comprising:
utilizing software for converting a full-virtualized file into a para-virtualized file when the computer system receives a click signal; and
activating a virtual machine, and uploading the para-virtualized file to a cloud server;
wherein the step of utilizing the software for converting the full-virtualized file into the para-virtualized file when the computer system receives the click signal comprises:
displaying files which are completely converted and uploaded, files which are completely converted but still uploading, and files which are converting on an uploading interface of the computer system;
displaying an uploading button corresponding to the click signal on the uploading interface; and
selecting the full-virtualized file in the computer system when the computer system receives the click signal corresponding to the uploading button, and the software converting the full-virtualized file into the para-virtualized file after receiving the click signal from the uploading interface.
2. The file converting method of claim 1, wherein when the full-virtualized file comprises a plurality of sub-files, the plurality of sub-files are merged into a single file.

3. The file converting method of claim 1, further comprising displaying a plurality of fields on a setting interface, wherein the plurality of fields correspond to settings of a plurality of converting parameters.

4. The file converting method of claim 3, wherein the plurality of converting parameters comprise a memory size setting of the virtual machine, a setting corresponding to a processor of the virtual machine, an address of the cloud server and a storage space of the cloud server.

5. The file converting method of claim 1, wherein the full-virtualized file comprises a .vmdk file of VMware virtualization software.

6. The file converting method of claim 1, wherein the para-virtualized file comprises a .xen file and the virtual machine is executed by Xen para-virtualization software.

7. The file converting method of claim 1, wherein the converting method is realized by replacing a file configuration and a core of an operating system of the computer system when the operating system is Linux.

8. The file converting method of claim 1, wherein the converting method is performed by a para-virtualization driver installed in the computer system when an operating system of the computer system is Windows.

9. A non-transitory computer-readable storage medium, having embodied a program being executable by a processor to perform a file converting method for a computer system, the file converting method comprising:
   utilizing software for converting a full-virtualized file into a para-virtualized file when the computer system receives a click signal; and
   activating a virtual machine, and uploading the para-virtualized file to a cloud server;
   wherein the method of utilizing the software for converting the full-virtualized file into the para-virtualized file when the computer system receives the click signal comprises:
      displaying files which are completely converted and uploaded, files which are completely converted but still uploading, and files which are converting on an uploading interface of the computer system;
      displaying an uploading button corresponding to the click signal on the uploading interface; and
      selecting the full-virtualized file in the computer system when the computer system receives the click signal corresponding to the uploading button, and the software converting the full-virtualized file into the para-virtualized file after receiving the click signal from the uploading interface.

10. The non-transitory computer-readable storage medium of claim 9, wherein when the full-virtualized file comprises a plurality of sub-files, the plurality of sub-files are merged into a single file.

11. The non-transitory computer-readable storage medium of claim 9, further comprising executable instructions for displaying a plurality of fields on a setting interface, wherein the plurality of fields correspond to settings of a plurality of converting parameters.

12. The non-transitory computer-readable storage medium of claim 11, wherein the plurality of converting parameters comprise a memory size setting of the virtual machine, a setting corresponding to a processor of the virtual machine, an address of the cloud server and a storage space of the cloud server.

13. The non-transitory computer-readable storage medium of claim 9, wherein the full-virtualized file comprises a .vmdk file of VMware virtualization software.

14. The non-transitory computer-readable storage medium of claim 9, wherein the para-virtualized file comprises a .xen file and the virtual machine is executed by Xen para-virtualization software.

15. The non-transitory computer-readable storage medium of claim 9, wherein the converting method is realized by replacing a file configuration and a core of an operating system of the computer system when the operating system is Linux.

16. The non-transitory computer-readable storage medium of claim 9, wherein the converting method is performed by a para-virtualization driver installed in the computer system when an operating system of the computer system is Windows.

* * * * *